United States Patent [19]
Sovis

[11] Patent Number: 6,000,757
[45] Date of Patent: Dec. 14, 1999

[54] VEHICLE SEAT ADJUSTER

[75] Inventor: David M. Sovis, Grand Haven, Mich.

[73] Assignee: Track Corp., Grand Haven, Mich.

[21] Appl. No.: 08/916,908

[22] Filed: Aug. 14, 1997

[51] Int. Cl.$^6$ ................................................. B60N 2/12
[52] U.S. Cl. ................... 297/344.1; 297/362.11; 297/362.14; 297/330; 297/354.12; 297/440.15; 248/430
[58] Field of Search ................................ 297/330, 361.1, 297/344.1, 362.11, 362.12, 362.13, 362.14, 440.15, 440.1, 354.12, 354.1; 248/430

[56] References Cited

U.S. PATENT DOCUMENTS

| | | |
|---|---|---|
| 2,609,029 | 9/1952 | Haberstump . |
| 3,066,907 | 12/1962 | Latimer et al. . |
| 4,530,540 | 7/1985 | Hayden et al. ......................... 248/430 |
| 4,720,073 | 1/1988 | Mann et al. . |
| 4,756,576 | 7/1988 | Bianchi et al. ....................... 297/361.1 |
| 4,770,463 | 9/1988 | Nishino ................................ 297/344.1 |
| 5,137,244 | 8/1992 | Negi ....................................... 248/430 |
| 5,144,849 | 9/1992 | Alhara et al. ........................... 297/330 |
| 5,306,073 | 4/1994 | Rees .................................... 297/362.14 |
| 5,323,998 | 6/1994 | Aihara . |
| 5,342,013 | 8/1994 | Ito et al. . |
| 5,370,350 | 12/1994 | Orkano et al. . |
| 5,447,352 | 9/1995 | Ito et al. . |
| 5,473,958 | 12/1995 | Jeck et al. . |
| 5,711,577 | 1/1998 | Whalen .............................. 297/362.11 |
| 5,765,798 | 6/1998 | Isomura ................................. 297/330 |
| 5,769,377 | 6/1998 | Gauger .................................. 248/430 |
| 5,795,024 | 8/1998 | Collins et al. ..................... 297/362.11 |

*Primary Examiner*—Anthony D. Barfield
*Attorney, Agent, or Firm*—Warner Norcross & Judd

[57] ABSTRACT

A vehicle seat adjuster having a single rail and an integral recliner mechanism on each side of the seat. The rails are secured to the floor by generally conventional floor supports. The recliner mechanisms each include rollers positioned both above and below the corresponding rail. Forward and rearward adjustment of the seat is obtained by moving the recliner mechanisms along the rails. In addition, each integral recliner mechanism includes upper arms that form the upright portions of the seat back frame. A seat back, preferably a molded seat back, is attached directly to the upper arms of the integral recliner mechanism.

16 Claims, 10 Drawing Sheets

FIG. I

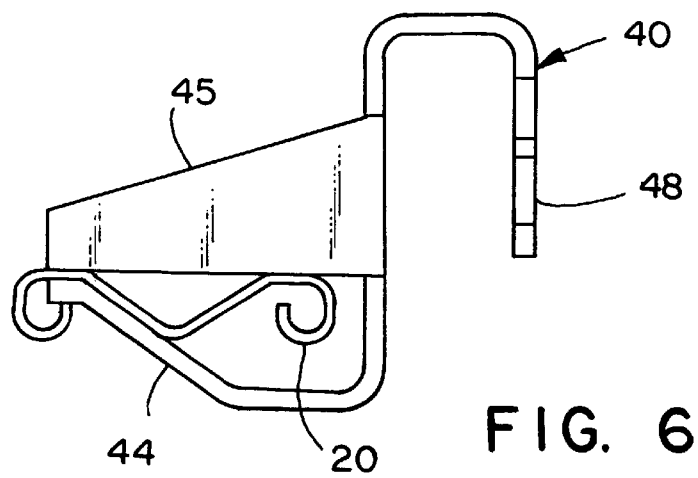
FIG. 6
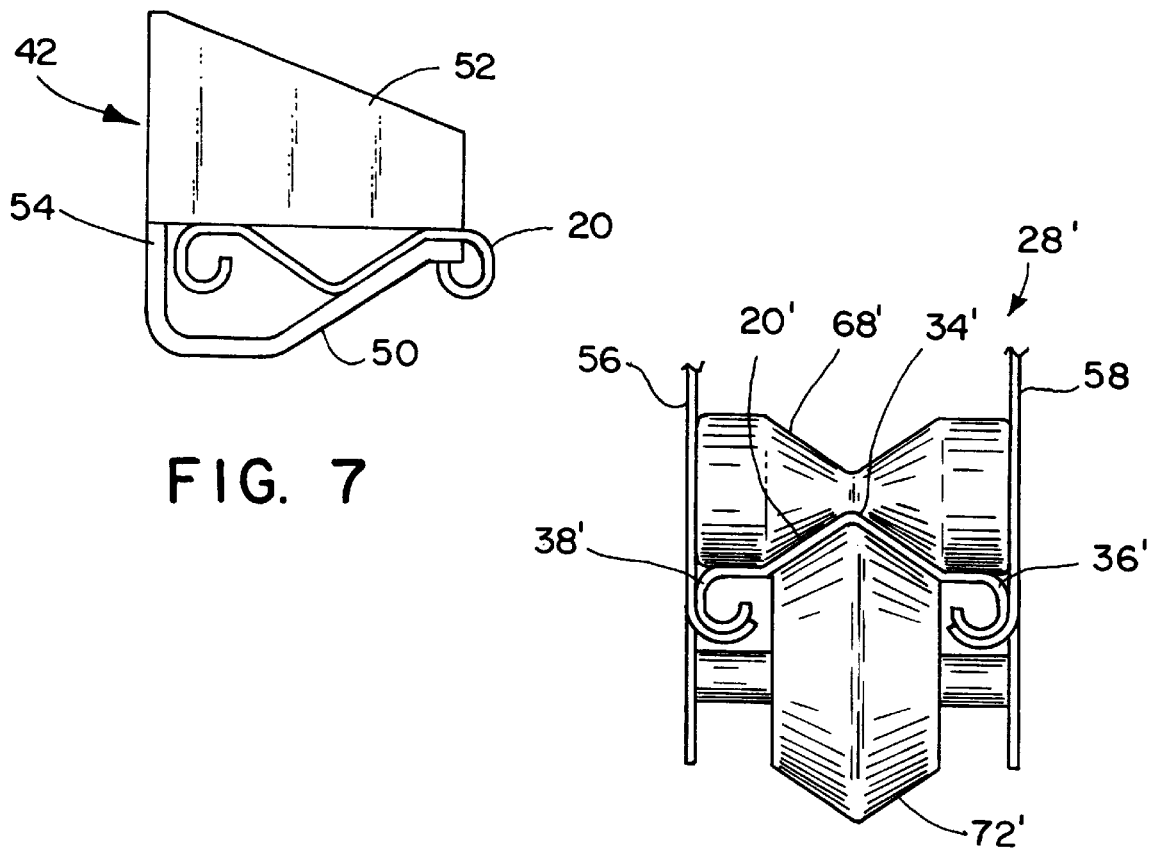
FIG. 7
FIG. 14

VEHICLE SEAT ADJUSTER

BACKGROUND OF THE INVENTION

The present invention relates to vehicle seats, and more particularly to adjusters for vehicle seats.

A conventional vehicle seat, and particularly a front vehicle seat, typically includes a seat frame and a seat adjuster. The seat adjuster typically includes a rail mechanism that is mounted to the floor of the vehicle and to the seat frame. The rail mechanism includes a separate rail assembly positioned on each side of the seat. Each rail assembly includes a first rail that is attached to the floor pan and a second rail that is attached to the seat frame. The rails are slidably interconnected to permit selective forward and rearward movement of the seat frame. Many conventional seat adjusters also include height adjustment mechanisms which allow the height of the seat to be adjusted. Often, the seat adjuster will include independent front and rear height adjustment mechanisms to permit adjustment of the angle of the seat.

The seat frame generally includes a cushion frame and a back frame that are separately mounted to the seat adjuster. The front and rear of the cushion frame are typically mounted to the front and rear height adjustment mechanisms while the back frame is typically secured to the second rail by a recliner mechanism. The recliner mechanism includes a first arm attached to the second rail and second arm attached to the back frame. The two arms of the recliner mechanism are pivotally interconnected to permit selective adjustment of the angle between the back frame and the seat adjuster.

There is an increasing trend in the automotive industry toward "integral restraint" or "all belts to seat" designs. In these designs, the seat belts are secured to the seat assembly rather than to the vehicle floor pan, body pillar or other structural member. These constructions facilitate assembly of the vehicle. However, because they are required to withstand the forces transmit through the seat belt, these designs require more strength than conventional designs. There is a current need for a relatively inexpensive, high strength seat adjuster that meets the strength requirements of an "all belts to seat" design.

Currently, the various components of a vehicle seat, such as the seat adjuster, the recliner mechanism, and the seat frame, are separately manufactured-usually by different suppliers. The seat components are often collected and assembled by one or more additional suppliers. The relatively large number of suppliers involved in the manufacture and assembly of a vehicle seat increases the costs of manufacturing and assembling the seat. Further, the multiplicity of connections between the various components raise quality control issues.

SUMMARY OF THE INVENTION

The aforementioned problems are overcome by the present invention which provides a seat adjuster having a single rail and an integral recliner mechanism on each side of the seat. Each integral recliner mechanism is slidably secured directly to the corresponding single rail, which is in turn secured to the floor of the vehicle.

The recliner mechanism on each side of the seat includes inner and outer plates that extend vertically along opposite sides of the rail. The bottom of each plate is shaped to wrap beneath the rail to slidably interlock the plate and the rail. The recliner mechanism is slidably connected to the rail by rollers position both above and below the rail. The recliner mechanism also includes an upright tube that is pivotally secured between the recliner plates. The lower end of the upright tube is pinned within a slot in the recliner plates to control its range movement. The upright tubes on opposite sides of the seat are adapted to directly receive and support a seat back.

In the preferred embodiment, the seat adjuster also includes a center horizontal drive assembly. The seat adjuster includes a horizontal drive bracket extending between and secured to the recliner mechanisms on opposite sides of the seat and a fixed cross strap extending between the floor supports on opposite sides of the seat. The drive assembly extends between the horizontal drive bracket and the fixed cross strap such that operation of the drive assembly results in forward or rearward movement of the horizontal drive bracket with respect to the cross strap. This in turn results in forward and rearward movement of the recliner mechanisms along the rails.

The present invention provides an inexpensive, high strength seat adjuster. The single rail design reduces the cost of manufacture and assembly. The integral recliner mechanism design eliminates the need for a separate recliner mechanism. In addition, the interlocking design of the recliner plates and single rail bolster the seat adjuster against vertical forces exerted against the seat.

The upright tubes of the recliner mechanism are adapted to directly receive and support a seat back, thereby eliminating the need for additional back tubes. Also, both upright tubes are pinned to the recliner mechanisms to control the range of movement of the seat back. As a result, horizontal forces exerted against the seat back will be transmit to both sides of the seat adjuster once the seat back has reached the limit of its movement. Therefore, a single side of the seat adjuster is not required to withstand all of the forces generated during a collision.

Further, the center drive assembly of the present invention requires only a single motor and a single gear box to move both sides of the seat. This provides cost savings over conventional drive assemblies which require two gear boxes and sometimes two motors.

These and other objects, advantages, and features of the invention will be readily understood and appreciated by reference to the detailed description of the preferred embodiment and the drawings.

BRIEF DESCRIPTION OF THE DRAWINGS

FIG. 6 is an enlarged view of a portion of the rail assembly showing the front floor support;

FIG. 7 is an enlarged view of a portion of the rail assembly showing the rear floor support;

FIG. 14 is an enlarged view of a portion of an alternative rail assembly.

DETAILED DESCRIPTION OF THE PREFERRED EMBODIMENT

Figure 1:
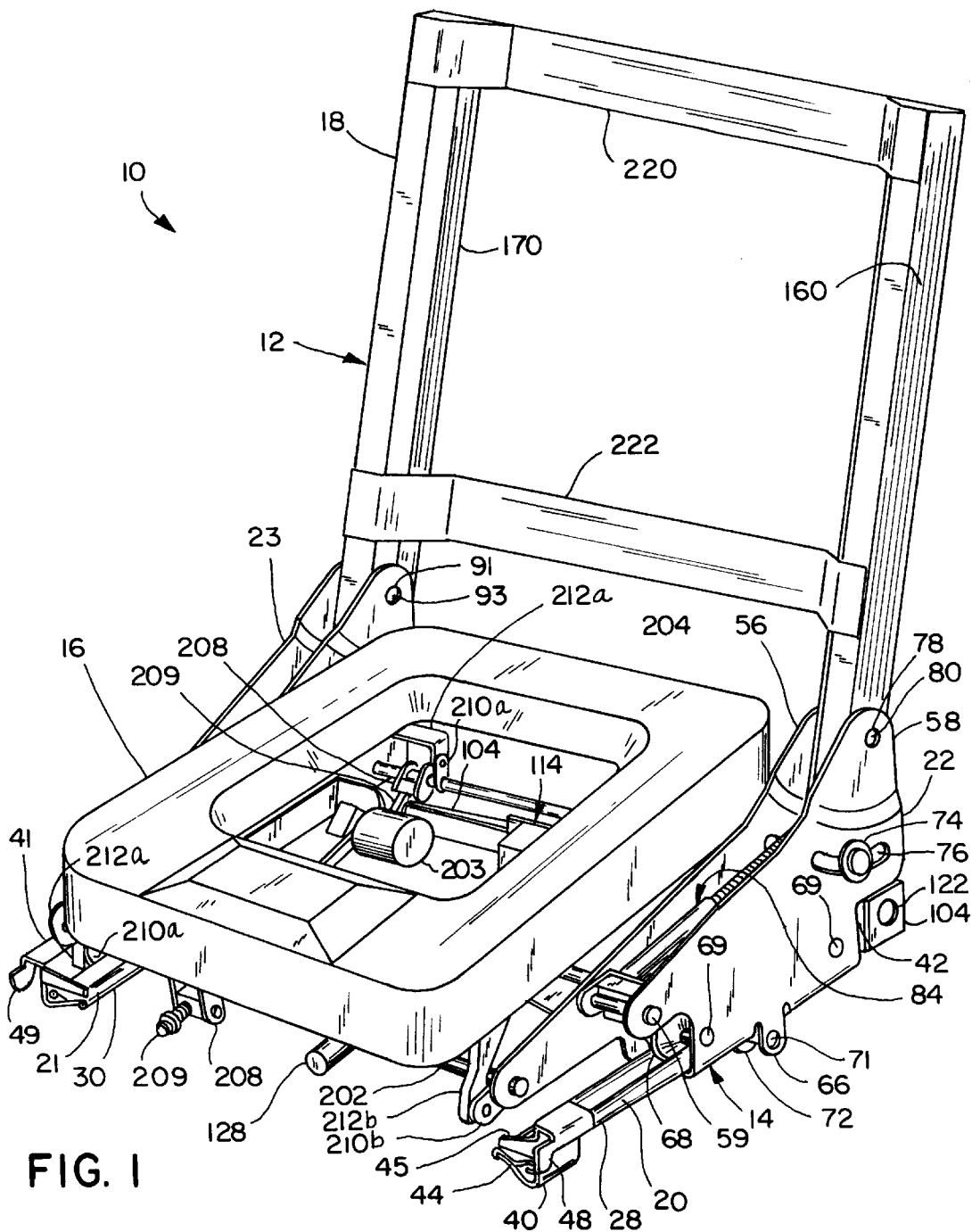
FIG. 1 is a perspective view of a seat adjuster according to a preferred embodiment of the present invention.
Figure 2:
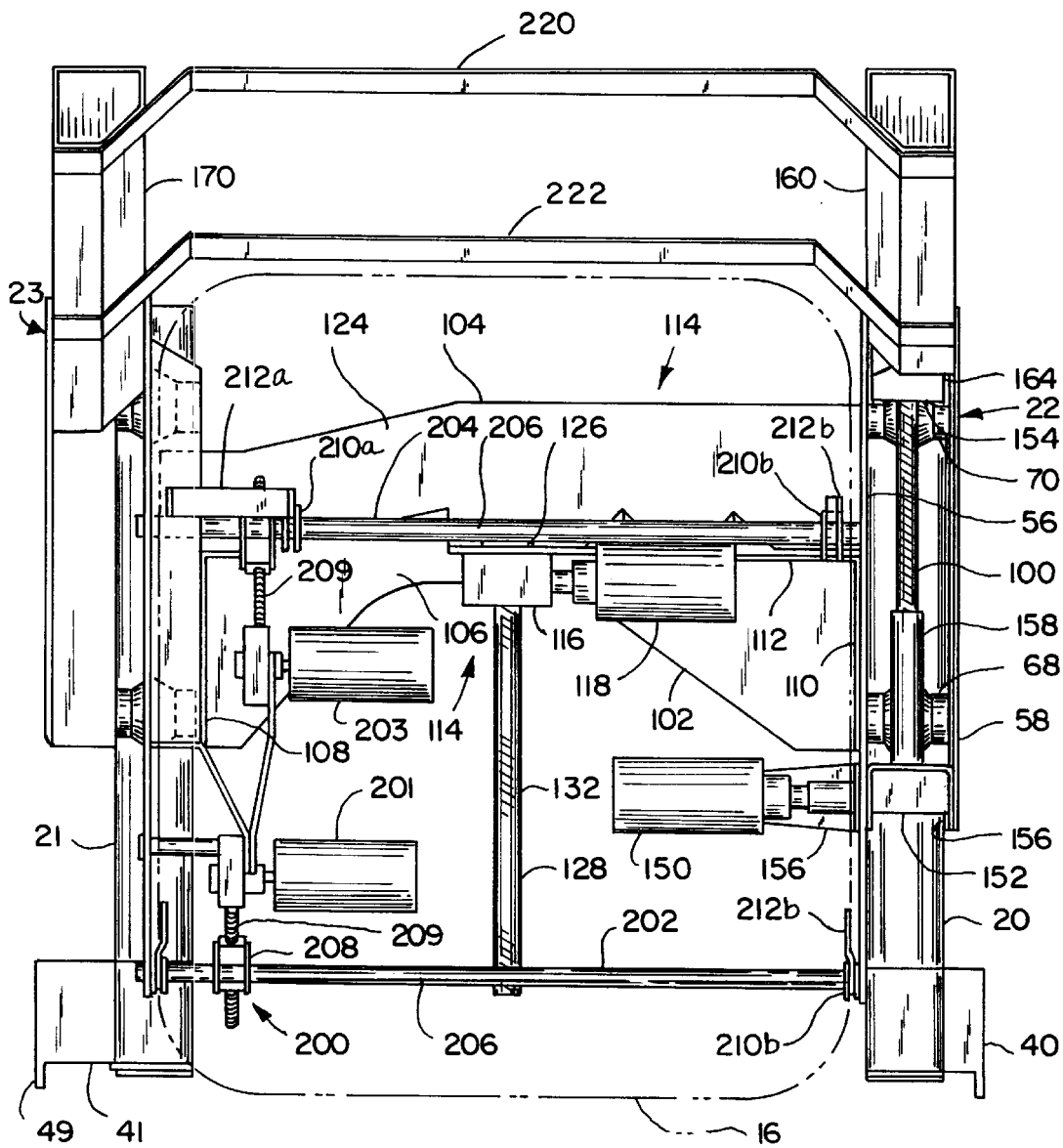
FIG. 2 is a top plan view of the seat adjuster.
Figure 3:
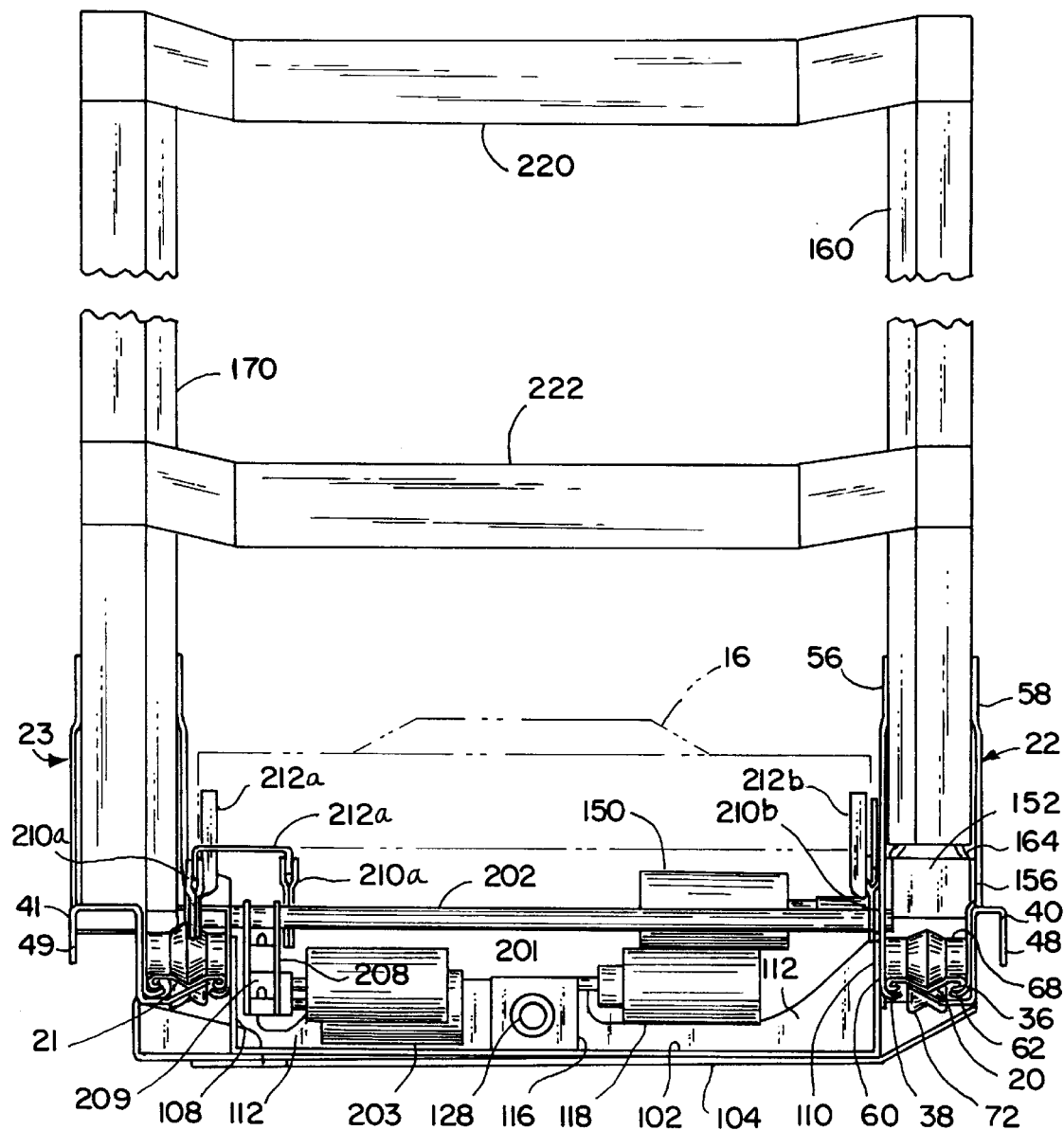
FIG. 3 is a front elevational view of the seat adjuster.
Figure 4:
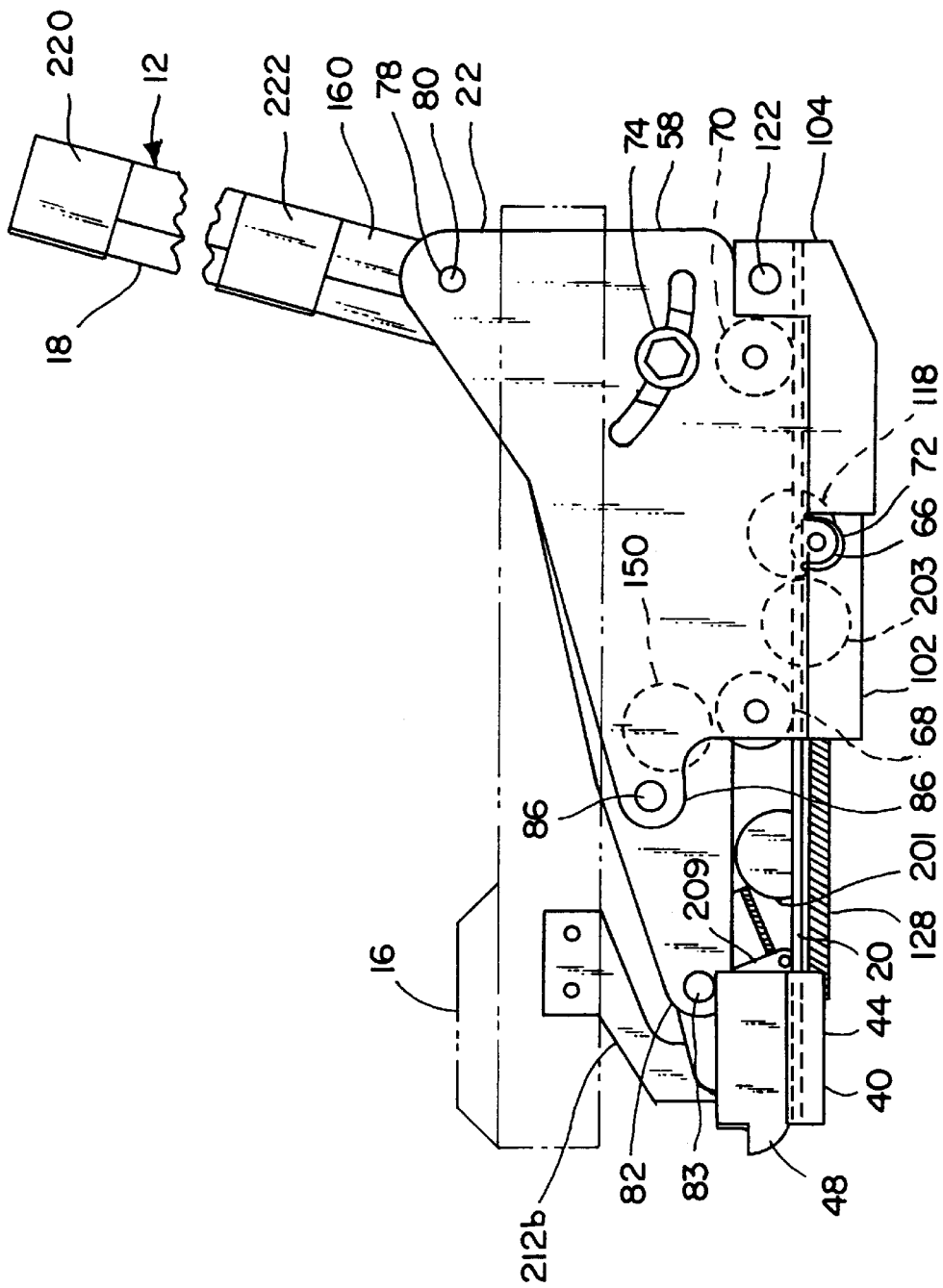
FIG. 4 is a side elevational view of the seat adjuster.

A vehicle seat incorporating a seat adjuster according to preferred embodiment of the present invention is illustrated in FIGS. 1–4 and generally designated 10. For purposes of disclosure, the present invention is described in connection with a conventional automotive vehicle seat having a six-way seat adjuster that permits forward and rearward (horizontal) adjustment of the seat as well as independent height and angle (vertical) adjustment. Those skilled in the field will appreciate that the present invention is well suited for use in other seat applications. For example, the present invention is well suited for use with two-way and four-way seat adjusters. The seat 10 is illustrated in FIG. 1 without cushions, upholstery or trim. These and other conventional accessories, such as a lumbar support, a headrest, and a bolster, can be added to the seat 10 in a conventional manner using conventional techniques and apparatus. Also, a conventional "all belts to seat" seat belt assembly can be attached to the seat 10 in a conventional manner. In this description, directional terms, such as front, rear, left, and right, will be used to denote directions from the perspective of an individual positioned in the seat 10.

The seat 10 generally includes a seat frame 12 mounted upon a seat adjuster 14 (See FIG. 1). The seat frame 12 includes a cushion frame 16 (or seat pan) and a back frame 18, each separately secured to the seat adjuster 14. The seat adjuster 14 includes a pair of rail assemblies 28 and 30 located on opposite sides of the seat 10 (See FIGS. 2 and 3). For purposes of disclosure, only the left rail assembly 28 will be described in detail. The other rail assembly 30 is similar in design and construction except as described below. Each rail assembly 28 and 30 includes a rail 20 and 21 that is mounted to the floor of the vehicle and an integral recliner mechanism 22 and 23 that is slidably mounted to the rail 20 (See FIG. 4). The integral recliner mechanisms 22 and 23 support the seat frame 12 and are selectively movable along the rails 20 and 21 to permit forward and rearward adjustment of the seat 10. The seat 10 preferably includes a horizontal drive assembly 114 that functions to simultaneously move the recliner mechanisms 22 and 23, and consequently the seat frame 12, along the rails 20 and 21. The integral recliner mechanisms 22 and 23 are articulated to permit the back frame 18 to pivot with respect to the cushion frame 16.

Figure 5:
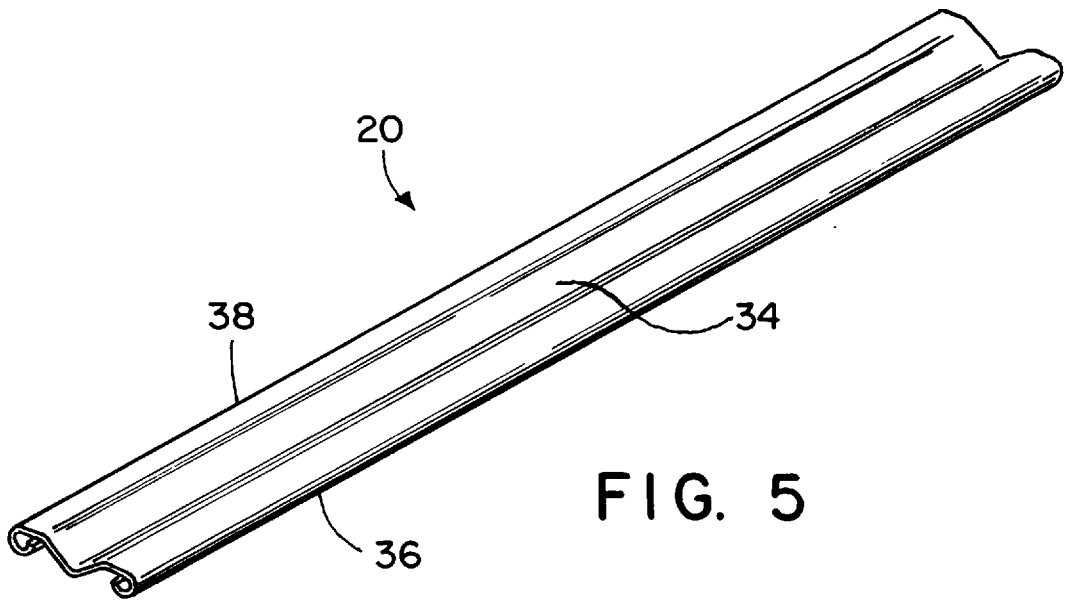
FIG. 5 is a perspective view of the rail.

The rail 20 of the left rail assembly 28 will be described with reference to FIG. 5. The rail 21 of the right rail assembly 30 is generally identical to the rail 20. The rail 20 is an elongate member having a central web 34 extending between a pair of longitudinal edge portions 36 and 38. The edge portions 36 and 38 are rolled under to provide the rail 20 with longitudinal strength. In cross section, the central web 34 includes a generally shallow "V" shape (See also FIG. 3). This shape provides the rail 20 with longitudinal strength and helps to ensure proper alignment of the rollers as described below. Obviously, the precise shape of the rail 20 can vary from application to application.

The rails 20 and 21 are secured to the floor of the vehicle by front and rear floor supports. The described floor supports are merely exemplary, and they can vary in design and construction from application to application depending in large part on the design of the vehicle floor pan. As illustrated in FIG. 1, the rails of the left rail assembly 28 are secured to the floor pan (not shown) by front and rear support flanges 40 and 42, respectively. In the preferred embodiment, the front floor support 40 is welded or otherwise attached directly to the front of the rail 20. As perhaps best show in FIG. 6, the front floor support 40 includes a rail engagement portion 44 that follows along and is attached (e.g. welded) to a portion of the bottom surface of the rail 20 and a reinforcement arm 45 that extends across the top surface of the rail 20 to bolster the rail assembly against vertical forces that tend to pull the rail away from the front floor support 40. The front floor support 40 also includes a floor engagement portion 46 that extends outwardly from the rail engagement portion 44. The floor engagement portion 46 includes a tab 48 that is fitted within a slot in the floor pan (not shown) to secure the front of the seat adjuster 14. The front floor support 41 of the right rail assembly 30 includes a similar tab 49. The rear floor support 42 is welded or otherwise attached directly to the rear of the rail 20. As perhaps best illustrated in FIG. 7, the rear floor support 42 includes a rail engagement portion 50 that follows along and is attached to a portion of the bottom surface of the rail 20. The rear floor support 42 also includes reinforcement arms 52 that extend over the top surface of the rail 20 to bolster the rail assembly against vertical forces that tend to pull the rail away from the rear floor support 42. The rear floor support 42 further includes a floor engagement portion 54 that defines a mounting hole for bolting, riveting or otherwise securing the support 42 directly to the floor pan (not shown). The rear floor support (not shown) of the right rail assembly 30 defines a similar mounting hole (not shown) for securing it to the floor pan.

To install the seat adjuster 14 in a vehicle, the seat adjuster 14 is tilted forwardly and the tabs 48 and 49 of the front floor supports 40 and 41 are fitted within slots in the vehicle floor pan (not shown). The seat adjuster 14 is then tilted rearwardly causing the tabs 48 and 49 to catch within the slots (not shown). The rear floor supports 42 are then bolted, riveted, or otherwise secured to the floor pan to lock the seat adjuster 14 in place.

As noted above, an integral recliner mechanism 22 and 23 is slidably mounted directly to each rail 20 and 21. The recliner mechanism 22 of the left rail assembly 28 will be described in detail. The recliner mechanism 23 of the right rail assembly 30 differs from that of the left rail assembly primarily in that its recliner plates are shaped to provide an offset between the rail 21 and the seat frame 12. This offset compensates for the fact that, in this embodiment, the seat frame 12 is wider than the mounting area provided in the floor of the vehicle. In applications where the mounting area is as wide as the seat frame, no offset is required. The recliner mechanism 22 of the left rail assembly 28 includes inner and outer recliner plates 56 and 58, respectively, that extend substantially vertically along opposite longitudinal sides of the rail 20. Each plate 56 and 58 includes a J-shaped hook portion 60 and 62, respectively, extending along the bottom of the plate 56 and 58. The hook portions 60 and 62 are fitted around the corresponding longitudinal edge portion 36 and 38 of the rail 20. A small amount of clearance is provided between the hook portions 60 and 62 and the edge portions 36 and 38 so that under normal loads, the two portions do not contact each other (See FIG. 3). The amount of clearance is selected, however, so that under vertical loads, the hook portions 60 and 62 will engage the edge portions 36 and 38 to reduce the likelihood of the recliner mechanism 22 separating from the rail 20.

The recliner plates 56 and 58 also pivotally support the back frame 18 which, as described below, includes upright tubes 160 and 170. The plates 56 and 58 each define a tube mounting hole 78 that receives a bolt or pin 80 for pivotally attaching the upright tube to the recliner mechanism 22 and an arcuate slot 76 that receives a bolt or pin 74 to shepherd pivotal movement of the upright tube.

The seat adjuster 14 includes a recliner drive assembly 84 that controls the angle or orientation of the back frame 18 with respect to the cushion pan 16. The recliner drive assembly 84 is mounted to the left rail assembly 28. Accordingly, the inner and outer plates 56 and 58 of the left rail assembly 28 each define a mounting hole 86 that receives a bolt or pin 59 for pivotally securing the recliner drive assembly 84 to the recliner 22. Because the right rail assembly 30 does not include a recliner drive assembly, the mounting holes 86 are not needed in the recliner plates of the right rail assembly 30.

As described in more detail below, the seat adjuster 14 includes a generally conventional vertical height adjustment assembly 200 for independently controlling the height of the front and rear of the cushion frame 16. The height adjustment assembly 200 includes front and rear bell cranks that extend between and are pivotally secured to the inner plates of the left and right rail assemblies. The inner plate 56 includes an extended seat support portion 82 that extends forward beyond the forward edge of the outer plate 58 to support the front bell crank 202. The inner plate 56 defines a front crank mounting hole 83 that receives and supports one end of the front bell crank 202 and a rear crank mounting hole 81 that receives and supports one end of the rear bell crank 204.

The plates 56 and 58 cooperatively support two upper rollers 68 and 70 and a lower roller 72 that engage and ride along the top and bottom surfaces of the rail 20, respectively. The upper rollers 68 and 70 extend between the plates 56 and 58 immediately above the rail 20 and are spaced apart from one another to provide the recliner mechanism 22 with stability. Each plate 56 and 58 defines a pair of upper roller mounting holes 57 that receive a bolt or pin 69 for securing the upper rollers 68 and 70. In addition, each plate 56 and 58 includes an integral, centrally located lower roller support 64 and 66, respectively, that extends downwardly beyond the hook portions. The lower roller supports 64 and 66 each define a lower roller mounting hole 65 that receives a bolt or pin 71 for securing the lower roller 72.

Figure 10:
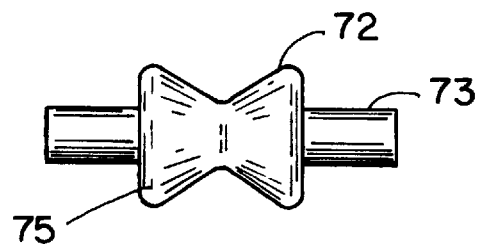
FIG. 10 is a front elevational view of a lower roller.
Figure 9:
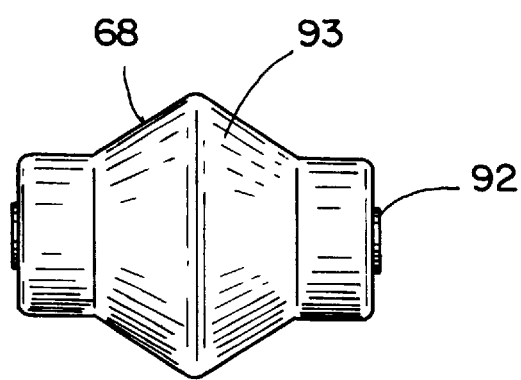
FIG. 9 is a front elevational view of an upper roller.
Figure 8:
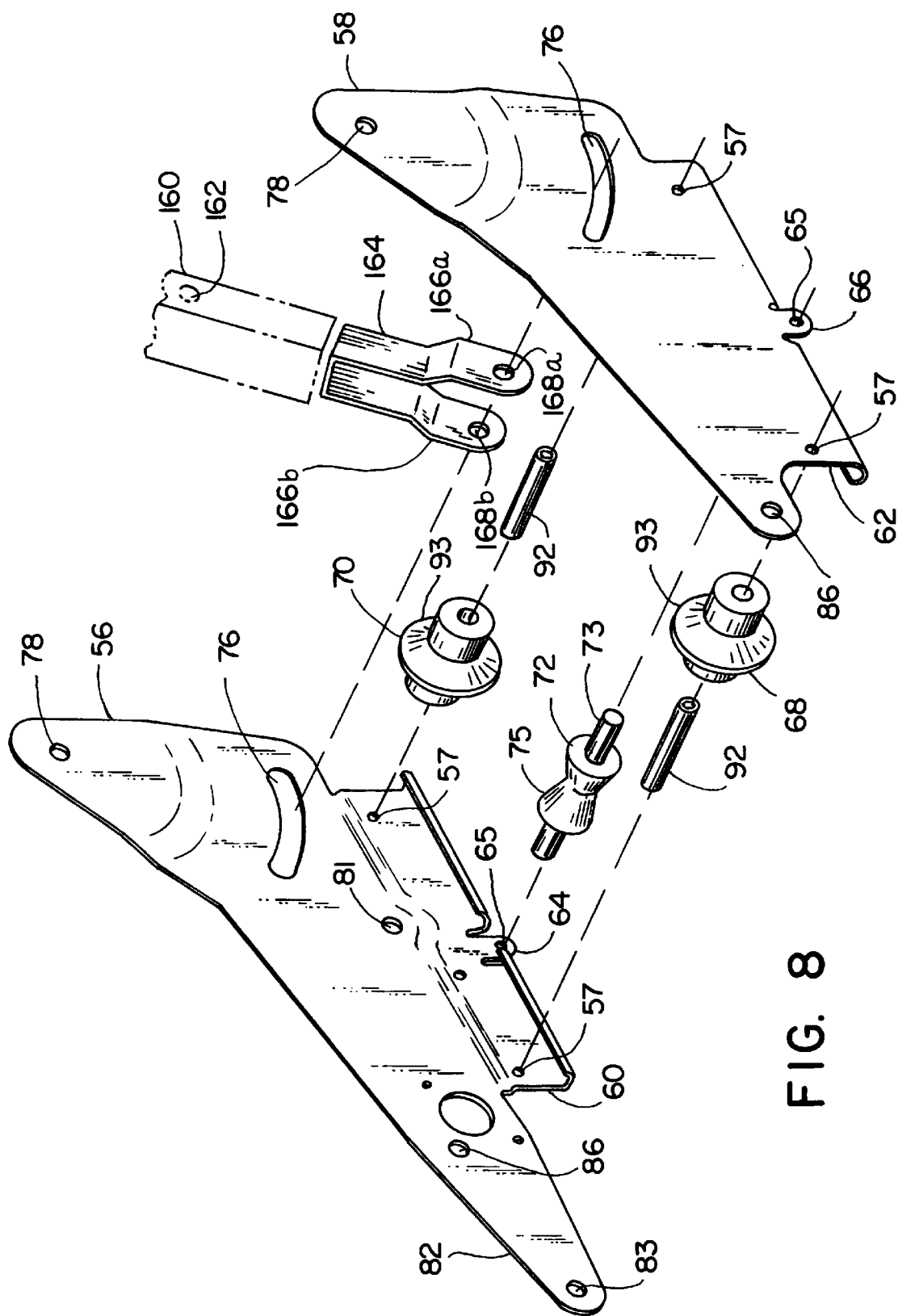
FIG. 8 is an exploded perspective view of the recliner mechanism.

The upper rollers 68 and 70 are generally conventional and will be described in more detail with reference to FIGS. 8 and 9. FIG. 9 is an enlarged view of the upper roller 68. The upper roller 70 is generally identical to the upper roller 68. The upper roller 68 includes a bolt or pin 69 extending between the plates 56 and 58, an anti-crush tube 92 fitted over the bolt, and a plastic roller sleeve 93 rotatably fitted over the anti-crush tube 92. As noted above, the lower roller 72 is mounted to lower roller supports 64 and 66, which lie approximately midway between the two upper rollers 68 and 70. The lower roller 72 includes a bolt or pin 71 extending between the two plates 56 and 58, an anti-crush tube 73 fitted over the bolt, and a plastic roller sleeve 75 rotatably fitted over the anti-crush tube 73 (See FIG. 10). The sleeve 75 is preferably secured to the anti-crush tube 73 by an "E" clip (not shown) or other conventional fastener which permits the sleeve to rotate about the tube 73.

The upright tubes 160 and 170 cooperate with a pair of horizontal straps 220 and 222 to form the back frame 18. The upright tube 160 of the left rail assembly 28 is pivotally mounted directly to the integral recliner mechanism and is adapted to interact with the recliner drive assembly 84. The upright tube 160 is an elongated tube which defines a pair of mounting holes 162 for pivotally attaching the upright tube 160 between the inner and outer plates. An inverted, generally U-shaped clevis 164 is fitted within the hollow lower end of the upright tube 160. The clevis 164 is preferably welded or otherwise secured to the upright tube 160. The legs 166a–b of the clevis 164 protrude from the bottom of the upright tube 160 and each defines a mounting hole 168a–b to receive a pin or bolt 74 for pivotally securing the clevis 164 within the arcuate slots 76.

The upright tube 170 of the right rail assembly 30 pivots through a slave relationship with the upright tube 160 of the left rail assembly 28, and therefore does not include a recliner drive assembly. Because the right rail assembly 30 does not include a recliner drive assembly, the upright tube 170 does not require a clevis. Instead, the upright tube 170 is made long enough to be pivotally interconnected directly with the arcuate slots 76. Like upright tube 160, the upright tube 170 defines a pair of mounting holes 91 to receive a pin or bolt 93 for pivotally attaching the upright tube 170 to the integral recliner mechanism. In addition, the upright tube 170 includes a pair of pin mounting holes (not shown) for securing a pivot control bolt or pin (not shown) to the upright tube 170. The pivot control pin (not shown) extends through the upright tube 170 and is slidably fitted within the arcuate slots (not shown) in the integral recliner mechanism of the right rail assembly 30. Both upright tubes 160 and 170 are of sufficient height and strength to support the remaining portions of the seat back, such as cushioning, upholstery, a lumbar support, a bolster, a head rest, and other conventional accessories.

Figure 11:
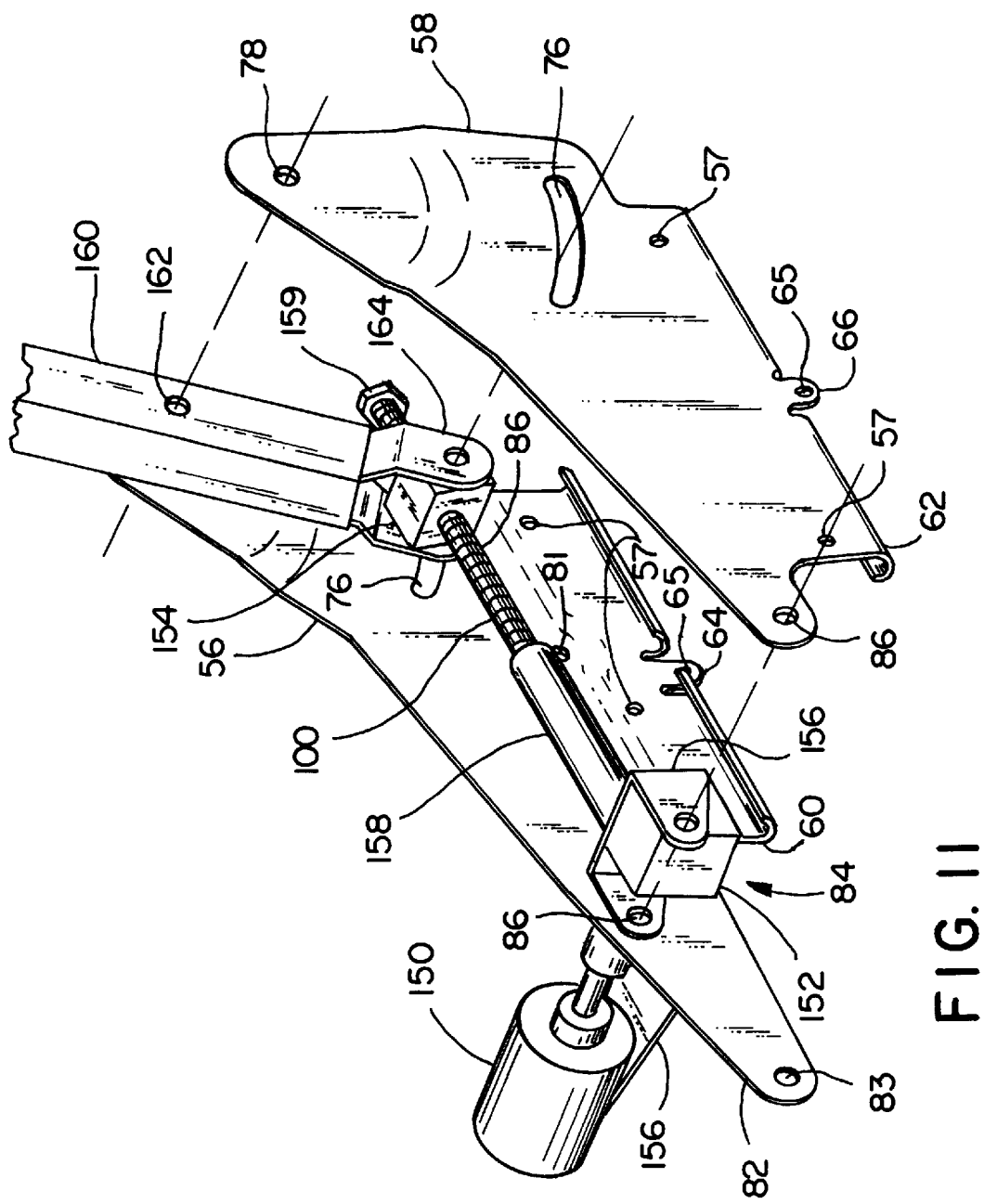
FIG. 11 is a perspective view of a portion of the seat adjuster with the outer recliner plate removed to show the recliner drive assembly.
Figure 12:
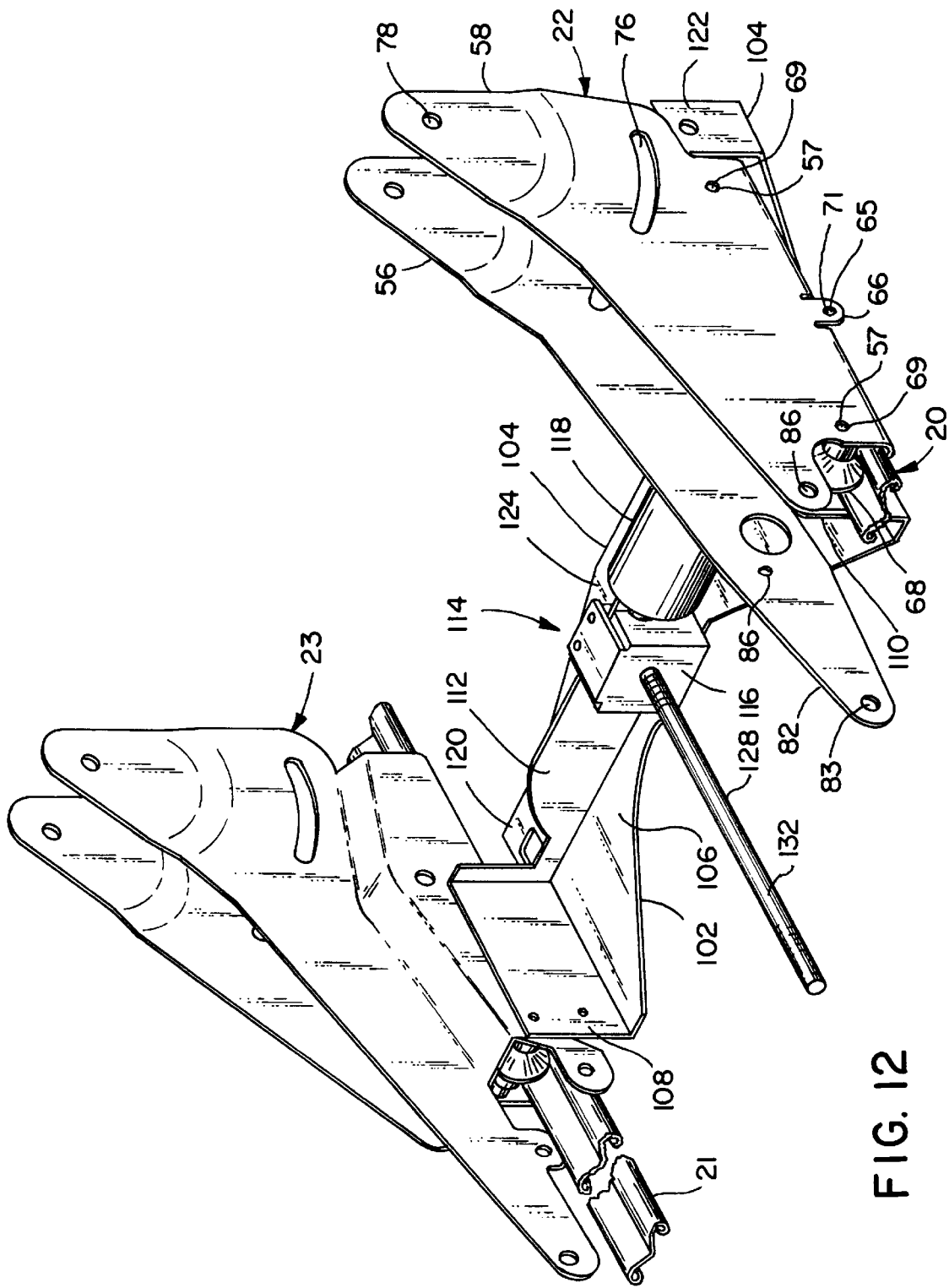
FIG. 12 is a perspective view showing the horizontal drive assembly.

The recliner drive assembly 84 is connected between the recliner plates 56 and 58 and the bottom end of the upright tube 160, and functions by causing the upright tube 160 to pivot about mounting pin 80. As perhaps best illustrated in FIG. 11, the recliner drive assembly 84 is generally conventional and includes a recliner drive motor 150, a recliner gear box 152 operatively connected with the motor 150, a drive screw 86 operatively connected with the gear box 152, and a drive nut 154 that is threadedly engaged with the drive screw 86. The recliner motor 150 is mounted to the inner plate 56 upon a motor bracket 156. The recliner motor 150 is operated by conventional controls (not shown). The gear box 152 is mounted between the inner and outer plates 56 and 58 and is a generally conventional right-angle drive. The gear box 152 is supported by a U-shaped drive reinforcement bracket 156 that is pivotally mounted between the inner and outer plates 56 and 58 by a conventional pivot bolt (not shown). The drive screw 86 is generally conventional and includes a threaded shaft 100. The drive screw 86 is operatively connected to the gear box 152. The drive nut 154 is threadedly fitted over the drive screw 86 and is pivotally secured to the clevis 164. In use, operation of the drive motor 150 drives the gear box 152 which in turn rotates the drive screw 86. Rotation of the drive screw 86 causes the drive nut 154 to travel along the shaft 100, either forwardly or rearwardly depending on the direction of rotation of the drive screw 86. Movement of the drive nut 154 along the screw 86 in turn causes the upright tube to pivot about its mounting point with the integral recliner mechanism 22, thereby varying the inclination of the seat back.

The recliner drive assembly 84 includes a stop tube 158 and stop nut 159 for limiting movement of the drive assembly 84. The stop tube 158 is preferably manufactured from plastic and is freely mounted over the shaft 100 of the drive screw 86 between the drive nut 154 and the gear box 152. The stop tube 158 limits forward movement of the drive nut 154 along the shaft 100. The length of the stop tube is selected to provide the desired forward limit. The stop nut 159 is mounted to the end of the shaft 100 opposite the gear box 152. The stop nut 159 limits rearward movement of the drive nut 154 along the shaft 100. The position of the stop nut 159 on the shaft 100 is selected to provide the desired rearward limit. Preferably, the screw 86 includes a reduced diameter end portion that receives the stop nut 159. As a result, the stop nut 159 can be secured against the shoulder between the reduced and full diameter portions of the shaft 100.

The pin/slot arrangement between the recliner and upright tubes functions as a secondary mechanism for limiting movement of the back frame 18. As noted above, the bottom of each upright tube 160 and 170 is pinned within the arcuate slots 76 in the corresponding recliner plates. In the event that the stop tube 158 or stop nut 159 fails (e.g. during a collision), the back frame 18 will be free to pivot until the pin or bolt 74 securing the upright tube to the slot 76 reaches the end of the slot 76. Once the pin or bolt 74 reaches the end of the slot 76, engagement of the pin or bolt 74 with the recliner plate will resist further pivotal movement of the back frame 18. It should also be noted that the left and right upright tubes 160 and 170 will reach the end of the corresponding slots 76 at the same orientation so that the forces applied to the seat 10 are transmit to both rail assemblies.

Figure 13:
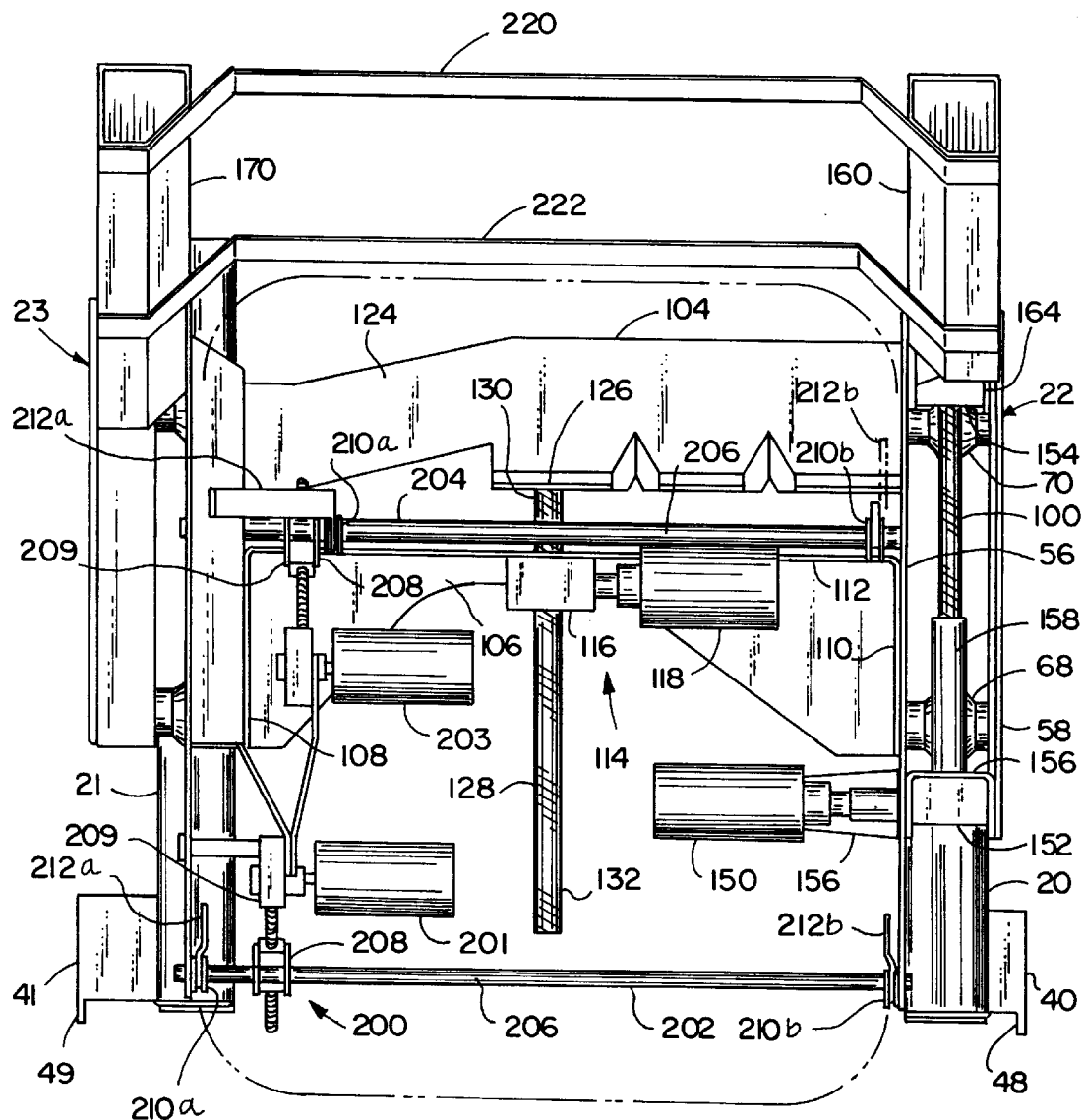
FIG. 13 is a top plan view of the seat adjuster showing the seat in the forward position.

As noted above, the seat adjuster 14 includes a horizontal drive assembly 114 for controlling forward and rearward adjustment of the seat. The seat adjuster 14 is shown in a rearward position in FIG. 2 and in a forward position in FIG. 13. The horizontal drive assembly includes a horizontal drive bracket 102 and a fixed cross strap 104. The horizontal drive bracket 102 is secured to and extends between the integral recliner mechanisms 22 and 23 on opposite sides of the seat 10. The horizontal drive bracket 102 includes a pair of mounting flanges 108 and 110 extending upwardly from opposite ends of a generally planar central portion 106. The mounting flanges 108 and 110 mount directly to the inner recliner plate 56 of the corresponding integral recliner mechanism 22 and 23. A wall 112 extends between the mounting flanges 108 and 110 across the rear edge of the horizontal drive bracket 102. A gear box 116 is mounted to a central portion of the wall 112. The gear box 116 is generally conventional and is driven by a horizontal drive motor 118. The horizontal drive motor 118 is also generally conventional and is preferably mounted directly to the gear box 116. The drive motor 118 is operated by conventional controls (not shown). The fixed cross strap 104 is secured to and extends between the rear floor supports 42 on opposite sides of the seat 10. Alternatively, the fixed cross strap 104 can be secured directly to the floor pan of the vehicle (not shown). The fixed cross strap 104 includes a pair of mounting flanges 120 and 122 extending from a central portion 124. The mounting flanges 120 and 122 are sandwiched between the floor pan and the corresponding rear floor supports 42 by conventional fasteners. The central portion 124 includes a centrally located, upright lead screw support 126. The lead screw support 126 receives and supports a conventional lead screw 128. The lead screw 128 includes a first end 130 attached directly to the support 126 and threaded shaft 132 that is operatively interfitted with the gear box 116. In use, operation of the drive motor 118 causes the gear box 116 to travel along the lead screw 128. Because the fixed cross strap 104 is secured to the floor of the vehicle, this causes the horizontal drive bracket 102 and the integral recliner mechanisms 22 to move forwardly and rearwardly along the rails 20.

The seat adjuster 14 also includes a vertical height adjustment assembly 200 that permits separate adjustment of the front and rear of the cushion frame 16. The vertical height adjustment assembly 200 is generally conventional and therefore will be described only briefly. The height adjustment assembly 200 can be replaced by a wide variety of alternative assemblies or completely eliminated if height adjustability is not desired. In general, the vertical height adjustment assembly 200 includes front and rear height adjustment motors 201 and 203 that separately actuate front and rear bell cranks 202 and 204, respectively. Each bell crank includes a shaft 206 having opposite ends that are pivotally mounted to the inner plates 56 of the two integral recliner mechanisms 22. Each bell crank also includes a crank 208 and a pair of clevises 210*a–b* extending radially from the shaft 206. The crank 208 is operatively connected to the corresponding adjustment motor by a conventional drive nut and lead screw arrangement 209 so that operation of the motor causes rotation of the bell crank. The clevises 210*a–b* are radially offset approximately ninety degrees from the crank 208 and are pivotally connected to a pair of seat brackets 212*a–b* that support the cushion frame 12. Accordingly, rotational movement of the bell crank 202 or 204 results in vertical movement of the front and/or rear of the cushion frame 12.

An alternative embodiment of the present invention is shown in FIG. 14, which is an enlarged view of a portion of an alternative left rail assembly 28'. With the exception of the shape of the rail and rollers, this embodiment is generally identical to the preferred embodiment described above. As illustrated, the alternative rail 20' includes a central web 34' that extends between longitudinal edge portions 36' and 38'. The central web 34' includes an inverted, shallow "V" shape. In addition, the rollers 68' and 72' are modified from the preferred embodiment to correspond with the shape of the rail 20'. While not shown, the rear upper roller is generally identical to the front upper roller 68'. Because the central web 34' is inverted, dirt and debris are less likely to collect between the top rollers and the top surface of the rail 20'.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A seat adjuster for a vehicle seat comprising:
   a rail assembly including a rail adapted to be mounted to a vehicle floor, said rail including a top surface and a bottom surface; and
   an integral recliner mechanism including a first portion mounted directly to said rail and a second portion adapted to receive and support a vehicle seat back, said integral recliner including a first recliner plate extending substantially vertically along a side of said rail, said recliner plate including an interlock portion interlocked with said rail, said integral recliner including a second recliner plate extending substantially vertically along a side of said rail opposite said first recliner plate, said first and second portions of said recliner mechanism pivotally interconnected to each other, said integral recliner mechanism further including a slide means for permitting said recliner mechanism to slide with respect to said rail, said slide means secured to said first recliner plate and including a first slide element slidably engaging said top surface of said rail and a second slide element slidably engaging said bottom surface of said rail, said slide elements being connected to and extending between said first and second recliner plates.

2. The seat adjuster of claim 1 wherein said slide elements are further defined as rollers.

3. The seat adjuster of claim 2 wherein said second recliner plate includes an interlock portion interlocked with said rail.

4. The seat adjuster of claim 3 wherein said second portion of said recliner mechanism includes an upright tube adapted to receive and support a vehicle seat back.

5. The seat adjuster of claim 4 wherein said upright tube is pivotally attached directly to at least one of said recliner plates.

6. The seat adjuster of claim 5 wherein said recliner mechanism includes a stop means for defining a range of motion of said upright tube.

7. The seat adjuster of claim 6 wherein said stop means includes a slot defined within at least one of said recliner plates and a pin extending from said upright tube.

8. A seat for a vehicle comprising:
a seat adjuster having a pair of rail assemblies positioned on opposite sides of the seat, at least one of said rail assemblies including a rail having a top surface and a bottom surface adapted to mount to a vehicle floor and an integral recliner mechanism, said recliner mechanism including a first portion slidably mounted directly to said rail and a second portion pivotally secured to said first portion, said recliner mechanism including a first recliner plate extending substantially vertically along a side of said rail, said first recliner plate including an interlock portion interlocked with said rail, said recliner mechanism including a second recliner plate extending substantially vertically along a side of said rail opposite said first recliner plate, said recliner mechanism including a first slide element slidably engaging said top surface of said rail and a bottom slide element slidably engaging said bottom surface of said rail, said slide elements being connected to and extending between said first and second recliner plates;
a seat back mounted to said second portion of said recliner mechanism; and
a seat cushion mounted to said recliner mechanism.

9. The seat of claim 8 wherein said slide elements are further defined as rollers.

10. The seat of claim 9 wherein said second recliner plate includes an interlock portion interlocked with said rail.

11. The seat of claim 10 wherein said second portion of said recliner mechanism includes an upright tube secured directly to and supporting said seat back.

12. The seat of claim 11 wherein said upright tube is pivotally attached directly to at least one of said recliner plates.

13. The seat of claim 12 wherein said recliner mechanism includes a stop means for defining a range of motion of said upright tube.

14. The seat of claim 13 wherein said stop means includes a slot defined within at least one of said recliner plates and a pin extending from said upright tube.

15. A seat for a vehicle comprising:
a seat adjuster having a pair of rail assemblies positioned on opposite sides of the seat, each of said rail assemblies including a rail adapted to mount to a vehicle floor and a moving portion slidably mounted to said rail;
a fixed cross strap secured between said rails on opposite sides of said seat;
a horizontal drive bracket secured between said moving portions of said rail assemblies on opposite sides of said seat; and
a single drive means for providing relative movement of said horizontal drive bracket with respect to said fixed cross strap and consequently of said moving portions with respect to said rail assemblies, said drive means operatively connected to both of said horizontal drive bracket and said fixed cross strap said drive means being located between said pair of said seat rail assemblies, said drive means including only a single drive motor and only a single gear box operatively connecting said drive bracket and said cross strap for providing simultaneous movement of both rail assemblies.

16. A seat for a vehicle comprising:
a seat adjuster having a pair of rail assemblies positioned on opposite sides of the seat, both of said rail assemblies including a rail adapted to mount to a vehicle floor and an integral recliner mechanism, said recliner mechanism including a first portion slidably mounted directly to said rail and a second portion pivotally secured to said first portion;
a seat back mounted to said second portion of said recliner mechanism;
a seat cushion mounted to said recliner mechanism;
a fixed cross strap secured between said rails on opposite sides of said seat;
a horizontal drive bracket secured between said first portions of said recliners on opposite sides of said seat; and
a drive means for providing relative movement of said horizontal drive bracket with respect to said fixed cross strap, said drive means including a single drive motor and a single gear box operatively connecting said drive bracket and said cross strap for providing simultaneous movement of both rail assemblies, said drive means including a lead screw secured to one of said drive bracket and said cross strap and a single gear box and drive motor secured to the other of said cross strap and said drive bracket, said lead screw being operatively connected to said drive motor by said gear box.

* * * * *